May 28, 1929.  F. C. CRAWFORD ET AL  1,714,660
PROCESS OF MAKING BALL SEATS
Filed April 24, 1926

INVENTORS:
FREDERICK C. CRAWFORD
MATTHEW P. GRAHAM
BY
ATTORNEY.

Patented May 28, 1929.

1,714,660

UNITED STATES PATENT OFFICE.

FREDERICK C. CRAWFORD AND MATTHEW P. GRAHAM, OF DETROIT, MICHIGAN, ASSIGNORS TO THOMPSON PRODUCTS INC., OF CLEVELAND, OHIO, A CORPORATION OF OHIO.

PROCESS OF MAKING BALL SEATS.

Application filed April 24, 1926. Serial No. 104,400.

The invention relates to a process for making ball seats adapted to serve as a bearing member for the ball of a ball stud, such as are commonly used in drag-links for automobiles. Such a ball stud consists of a substantially spherical enlargement on the end of a short shank, and, in use, the spherical enlargement engages one or more of such ball seats to serve as a bearing surface therefor.

Heretofore it has been the general practice to make such ball seats on what is commonly known as a screw machine from a solid rod of metal, which necessitates the employment of somewhat costly machinery, consumes a considerable time, and results in considerable loss of metal.

It is the object of this invention to simplify the process, speed production, and effect a saving in cost of the articles produced.

Accordingly we construct the article from a metal plate and use such pressing, forging or stamping operations as to leave comparatively little machine work to be done.

The invention consists of the process hereinafter described and claimed by which a steel disk is formed into a ball seat.

In the accompanying drawings, illustrating the steps of our process:

Figure 1:
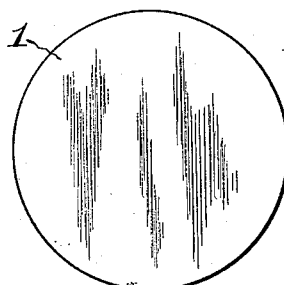
Figure 1 is a plan of a circular disk blank from which the ball seat is made.
Figure 2:
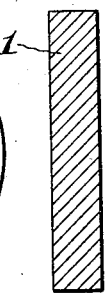
Fig. 2 is a section thereof.
Figure 5:
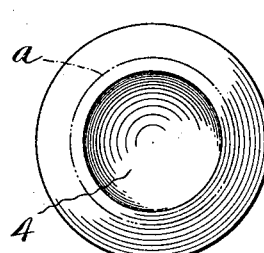
Fig. 5 is a face view of the blank formed by the pressing operation.
Figure 6:
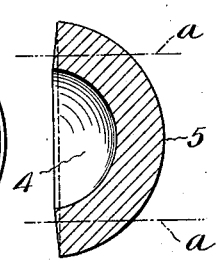
Fig. 6 is a section thereof.
Figure 3:
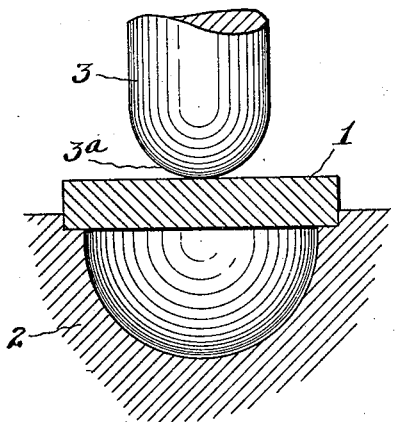
Fig. 3 is a view illustrating a die and punch with the blank disk positioned over the die for the first operation.
Figure 4:
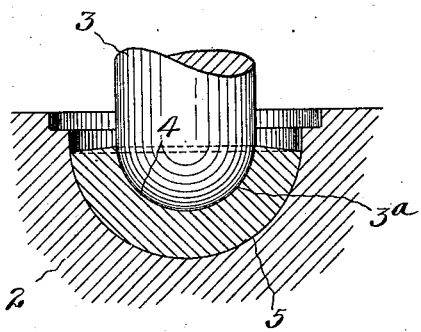
Fig. 4 is a view at the end of this operation showing the metal disk forced by the punch into the die, causing the metal blank to be pressed into concavo-convex form.

Referring to the drawings in detail, in which the same reference numeral is used throughout to designate the same part, the process is begun with a steel disk 1, formed in any well known way, such as by punching from a metal plate. As it is desired to form the metal cold, the plate selected is preferably one made of low carbon annealed steel made especially for heavy pressing or deep drawing work. The first step is to center the disk 1 over a die 2 and subject it to heavy pressure from a punch 3. The die 2 is preferably concave and hemispherical, as indicated, and the end $3^a$ of the punch is convex and hemispherical, the radius of curvature of the end of the punch being equal to the radius of the die less the thickness of the blank. The relation of the parts at the beginning of this operation is shown in Fig. 3 and their relation at the end of the first step is shown in Fig. 4, while Figs. 5 and 6 show the blank, so formed, in face view and vertical section. The result of the first step is that the blank is formed into a hemispherical shell having a concave spherical inner surface 4 and a convex outer spherical surface 5.

Figure 7:
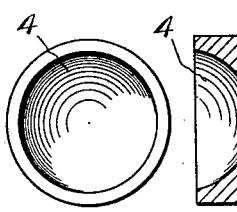
Figs. 7 and 8 are, respectively, a face view and a section of the blank after completion of the succeeding operation which consists in trimming away an annular portion from the outer margin of the partially formed blank shown in Figs. 5 and 6 on the line $a$ of these figures.
Figure 8:
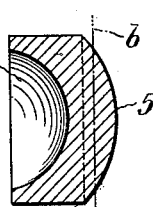
Figure 9:
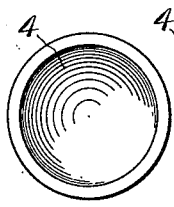
Figs. 9 and 10 are, respectively, a face and a sectional view at the end of a succeeding operation consisting in coin pressing the blank shown in Figures 7 and 8 to form the plane base of the ball seat.

The partially formed blank is next subjected to a shearing or machining operation by which an annulus of metal is removed from the outer margin thereof along the surface of a cylinder coaxial with the formed blank as indicated by lines $a$ in Figs. 5 and 6. As a result of this operation, the blank takes the form indicated in Figs. 7 and 8. In this form it might be utilized as a bearing for a ball stud under some circumstances, but ordinarily the convex surface 5 could not be properly seated. In order to provide such a seat it is necessary to subject the blank to another operation to provide a plane, instead of a curved surface. This is effected in any suitable way, as by removing, by machining, the convex surface up to the plane indicated by line $b$ of Fig. 8, or by coin-pressing the partially formed blank of Fig. 8 to the form shown in Fig. 10, which provides a flat base 6 to seat against a suitable abutment. Coin-pressing is effected by forcing the blank shown in Fig. 8 into a female die having the desired form of the completed article.

Figure 10:
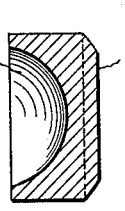
Figure 11:
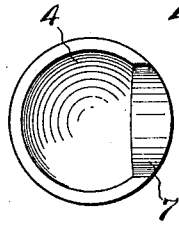
Figs. 11 and 12 are, respectively, a plan and a side elevation of the blank shown in Figs. 9 and 10 after the succeeding operation, which consists in forming a notch in the wall of the ball seat.

Instead of following the steps above indicated the article shown in Fig. 10 might be formed from the disk 1 in a single pressing or forging operation. To this end a smaller blank would be selected, and instead of forcing it into a die of spherical curvature a die made to conform to the plane or coin-pressed end 6, shown in Figure 10, would be provided. Using the same form of punch as before described, i. e., one with a hemispherical end, the same would be caused to force the blank into the die with such pressure that the metal would flow to form the base 6 shown in Fig. 10.

The product formed as shown in Fig. 10, is substantially the same as the product made with the well known screw machine. In order to give the product so formed the hardness and smoothness desirable for a good bearing surface and to enhance its appearance, it is preferable to subject it to the further well known steps of hardening and grinding.

Figure 12:
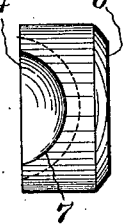

The ball seat as shown in Fig. 10 may be used in situations where the shank of the ball stud projects outwardly or away from the base 6; but in many situations it is necessary that the shank of the ball stud shall lie parallel to the base 6. In such case it is necessary to perform another operation on the part as shown in Fig. 12, which consists in cutting a semi-circular notch 7 in the wall, to a depth less than the depth of the bearing surface, thereby affording a shoulder to prevent escape of the ball while permitting the shank of the ball stud to extend therethrough.

It will be apparent from the above description, that we have devised a process for making ball seats which will economize material and cheapen the cost of production. The details of the process may be varied without departing from the principles above disclosed. Therefore it is to be understood that our invention is not to be confined to the details disclosed, but includes all departures therefrom falling within the terms of the appended claims.

What we claim is:

1. The process of making a bearing member, which consists in forming a substantially flat metal disk into a cup member having substantially concentric interior and exterior semi-spherical surfaces, and reducing the diameter of said cup member by trimming away an annular portion of the member to form an exterior cylindrical surface on and substantially coaxial with said member.

2. The process of making a bearing member, which consists in forming a substantially flat metal disk into a cup member having substantially concentric interior and exterior semi-spherical surfaces, reducing the diameter of said cup member by trimming away an annular portion of the member to form an exterior cylindrical surface on and substantially coaxial with said member, and thereafter cutting a transverse notch in said member shaped to receive the shank of a ball stud.

Signed by us this 16th day of April, 1926.

FREDERICK C. CRAWFORD.
MATTHEW P. GRAHAM.